United States Patent
Buryak

(10) Patent No.: US 9,282,071 B1
(45) Date of Patent: Mar. 8, 2016

(54) LOCATION BASED MESSAGE DISCOVERY

(71) Applicant: Google Inc., Mountain View, CA (US)

(72) Inventor: Kirill Buryak, Sunnyvale, CA (US)

(73) Assignee: Google Inc., Mountain View ( * ) Notice: Subject to any disclaimer, the term of this patent is extended or adjusted under 35 U.S.C. 154(b) by 386 days.

(21) Appl. No.: 13/844,054

(22) Filed: Mar. 15, 2013

(51) Int. Cl.
*H04L 12/58* (2006.01)
*G06Q 50/00* (2012.01)
*H04W 4/20* (2009.01)

(52) U.S. Cl.
CPC ............ *H04L 51/20* (2013.01); *G06Q 50/01* (2013.01); *H04L 12/588* (2013.01); *H04L 12/5865* (2013.01); *H04L 51/32* (2013.01); *H04W 4/206* (2013.01)

(58) Field of Classification Search
CPC ........................................................ H04L 51/20
USPC ............................................................ 709/206
See application file for complete search history.

(56) References Cited

U.S. PATENT DOCUMENTS

| | | | | |
|---|---|---|---|---|
| 6,085,099 A * | 7/2000 | Ritter | ............... | H04W 4/12 379/357.01 |
| 8,935,341 B2 * | 1/2015 | Bosworth | ........... | G06Q 10/10 709/204 |
| 9,009,249 B2 * | 4/2015 | Redfern | ............ | H04L 65/00 709/206 |
| 2003/0167314 A1 * | 9/2003 | Gilbert | ........... | H04L 29/06 709/217 |
| 2005/0010762 A1 * | 1/2005 | Schmidt | ........... | H04L 1/0057 713/165 |
| 2006/0242708 A1 * | 10/2006 | Oswall | ............ | G06Q 10/107 726/24 |
| 2010/0120450 A1 * | 5/2010 | Herz | ............. | H04M 3/42348 455/456.3 |
| 2010/0321402 A1 * | 12/2010 | Han | ............ | G06F 3/1415 345/619 |
| 2011/0038287 A1 * | 2/2011 | Agarwal | ......... | H04L 12/5865 370/310 |
| 2011/0047471 A1 * | 2/2011 | Lord et al. | ........ | 715/739 |
| 2011/0161427 A1 * | 6/2011 | Fortin | ........... | H04L 12/5865 709/206 |
| 2012/0165035 A1 * | 6/2012 | Chen | ............. | H04L 51/20 455/456.1 |
| 2012/0232994 A1 * | 9/2012 | Kim | ............. | G06Q 30/0261 705/14.58 |
| 2013/0217416 A1 * | 8/2013 | Matthews, III | ...... | H04W 4/028 455/456.2 |
| 2013/0232030 A1 * | 9/2013 | Gockeler et al. | ....... | 705/26.8 |
| 2014/0089422 A1 * | 3/2014 | Attalla | .......... | G06Q 50/01 709/206 |
| 2014/0129942 A1 * | 5/2014 | Rathod | .......... | H04N 21/44222 715/720 |
| 2014/0152666 A1 * | 6/2014 | Deng et al. | ........... | 345/440 |
| 2014/0162694 A1 * | 6/2014 | Maier | ............ | H04W 4/04 455/456.3 |
| 2014/0282084 A1 * | 9/2014 | Murarka | ........ | H04L 51/32 715/752 |
| 2015/0262208 A1 * | 9/2015 | Bjontegard | ...... | G06Q 30/0205 705/7.31 |

* cited by examiner

*Primary Examiner* — Backhean Tiv
(74) *Attorney, Agent, or Firm* — Patent Law Works LLP

(57) ABSTRACT

A method, computer program product, and computer system for receiving a message from a first user associated with a network, wherein the message is associated with a location. A notification is sent to a second user associated with a network that the message is available for viewing. Whether the second user is at the location is determined. A computing device associated with the second user is enabled to view only a portion of the message based upon determining that the second user is not at the location. The computing device associated with the second user is enabled to view the message in full based upon determining that the second user is at the location.

20 Claims, 6 Drawing Sheets

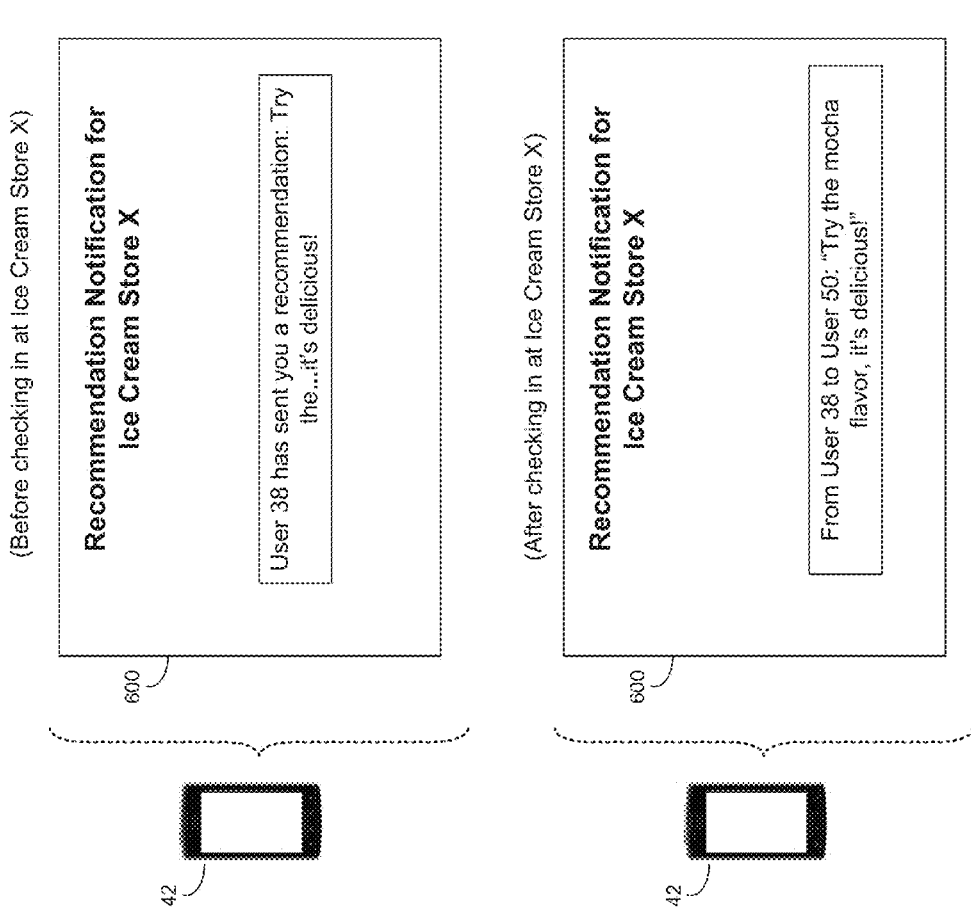

LOCATION BASED MESSAGE DISCOVERY

BACKGROUND

Users of today's communication network may enjoy conversing with one another by, e.g., sending messages to each other. Messages may be sent in numerous forms, including email, text message, blogs, or posting on another user's profile page, e.g., of a social network. With so many ways to communicate, users may be inundated with messages on a daily basis, which may make it difficult to entice some users to read a specific message at a specific time, and may also make it difficult to entice some users to follow recommended instructions that may have been provided in a specific message.

SUMMARY OF DISCLOSURE

In one implementation, a method, performed by one or more computing devices, comprises receiving, by one or more computing devices, a message from a first user associated with a network, wherein the message may be associated with a location. A notification is sent to a second user associated with the network that the message is available for viewing. Whether the second user is at the location is determined. A computing device associated with the second user is enabled to view only a portion of the message based upon determining that the second user is not at the location. The computing device associated with the second user is enabled to view the message in full based upon determining that the second user is at the location.

One or more of the following features may be included. Determining whether the second user is at the location may include determining whether the second user is at a second location, wherein the computing device associated with the second user may be enabled to view the message in full at the second location if both locations share at least part of a common name. The message may include a recommendation associated with the location. The notification may be sent to the second user based upon a proximity of the second user to the location. The notification may be sent to the second user via at least one of electronic mail, a text message, and a push notification. The second user may be selected from a list of users associated with the network. The message may be received from the first user at a profile page associated with the location.

In another implementation, a computing system includes a processor and a memory configured to perform operations comprising receiving a message from a first user associated with a network, wherein the message may be associated with a location. A notification is sent to a second user associated with the network that the message is available for viewing. Whether the second user is at the location is determined. A computing device associated with the second user is enabled to view only a portion of the message based upon determining that the second user is not at the location. The computing device associated with the second user is enabled to view the message in full based upon determining that the second user is at the location.

One or more of the following features may be included. Determining whether the second user is at the location may include determining whether the second user is at a second location, wherein the computing device associated with the second user may be enabled to view the message in full at the second location if both locations share at least part of a common name. The message may include a recommendation associated with the location. The notification may be sent to the second user based upon a proximity of the second user to the location. The notification may be sent to the second user via at least one of electronic mail, a text message, and a push notification. The second user may be selected from a list of users associated with the network. The message may be received from the first user at a profile page associated with the location.

In another implementation, a computer program product resides on a computer readable storage medium that has a plurality of instructions stored on it. When executed by a processor, the instructions cause the processor to perform operations comprising receiving a message from a first user associated with a network, wherein the message may be associated with a location. A notification is sent to a second user associated with the network that the message is available for viewing. Whether the second user is at the location is determined. A computing device associated with the second user is enabled to view only a portion of the message based upon determining that the second user is not at the location. The computing device associated with the second user is enabled to view the message in full based upon determining that the second user is at the location.

One or more of the following features may be included. Determining whether the second user is at the location may include determining whether the second user is at a second location, wherein the computing device associated with the second user may be enabled to view the message in full at the second location if both locations share at least part of a common name. The message may include a recommendation associated with the location. The notification may be sent to the second user based upon a proximity of the second user to the location. The notification may be sent to the second user via at least one of electronic mail, a text message, and a push notification. The second user may be selected from a list of users associated with the network. The message may be received from the first user at a profile page associated with the location.

Advantageously, users may be encouraged by a "treasure hunt" type activity between users of a network, such that additional recommendations and visits to a particular location (e.g., restaurant) may be generated.

The details of one or more implementations are set forth in the accompanying drawings and the description below. Other features and advantages will become apparent from the description, the drawings, and the claims.

BRIEF DESCRIPTION OF THE DRAWINGS

FIG. 6 is an illustrative diagrammatic view of a screen image displayed by the message process of FIG. 1 according to one or more implementations of the present disclosure.

DETAILED DESCRIPTION

Figure 1:
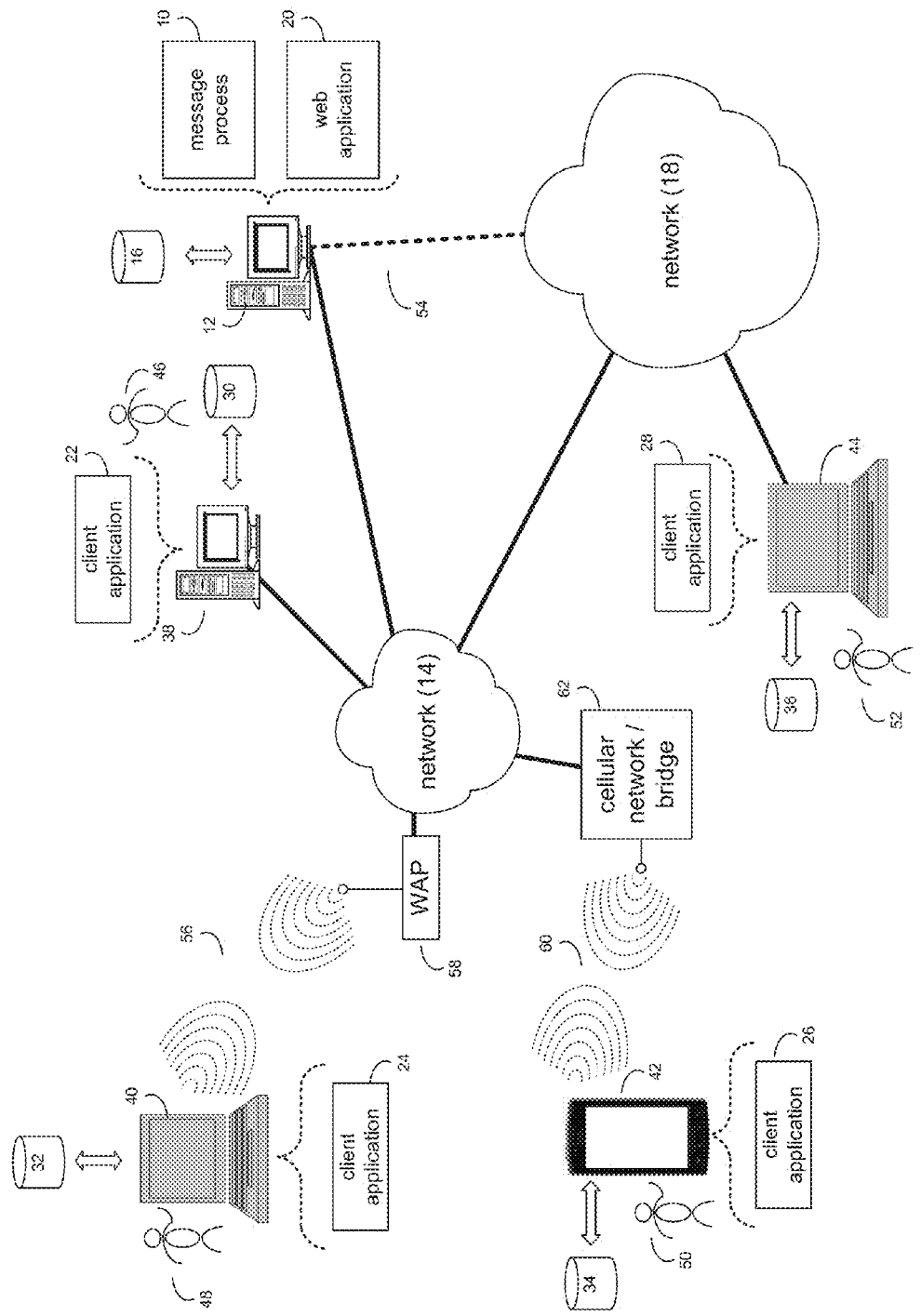
FIG. 1 is an illustrative diagrammatic view of a message process coupled to a distributed computing network according to one or more implementations of the present disclosure.

Referring to FIG. 1, there is shown message process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, a custom operating system.

As will be discussed below in greater detail, message process 10 may receive (e.g., by one or more computing devices), a message from a first user associated with a network, wherein the message may be associated with a location. A notification may be sent to a second user associated with a network that the message is available for viewing. Whether the second user is at the location may be determined. A computing device associated with the second user may be enabled to view only a portion of the message based upon, at least in part, determining that the second user is not at the location. The computing device associated with the second user may be enabled to view the message in full based upon, at least in part, determining that the second user is at the location.

The instruction sets and subroutines of message process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Message process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a web application (e.g., web application 20), examples of which may include, but are not limited to, e.g., a web site management application, a blogging application, a social network application, collaborative application, messaging application, or other application that allows for communication between two users (e.g., between two computing devices). Message process 10 and/or web application 20 may be accessed via client applications 22, 24, 26, 28. Message process 10 may be a stand alone application, or may be an applet/application/script that may interact with and/or be executed within web application 20. Examples of client applications 22, 24, 26, 28 may include, but are not limited to, e.g., a web site management application, a blogging application, a social network application, collaborative application, messaging application, or other application that allows for communication between two users (e.g., between two computing devices), a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, a custom operating system.

One or more of client applications 22, 24, 26, 28 may be configured to effectuate some or all of the functionality of message process 10 (and vice versa). Accordingly, message process 10 may be a purely server-side application, a purely client-side application, or a hybrid server-side/client-side application that is cooperatively executed by one or more of client applications 22, 24, 26, 28 and message process 10.

One or more of client applications 22, 24, 26, 28 may be configured to effectuate some or all of the functionality of web application 20 (and vice versa). Accordingly, web application 20 may be a purely server-side application, a purely client-side application, or a hybrid server-side/client-side application that is cooperatively executed by one or more of client applications 22, 24, 26, 28 and web application 20.

Users 46, 48, 50, 52 may access computer 12 and message process 10 directly through network 14 or through secondary network 18. Further, computer 12 may be connected to network 14 through secondary network 18, as illustrated with phantom link line 54. Message process 10 may include one or more user interfaces, such as browsers and textual or graphical user interfaces, through which users 46, 48, 50, 52 may access message process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
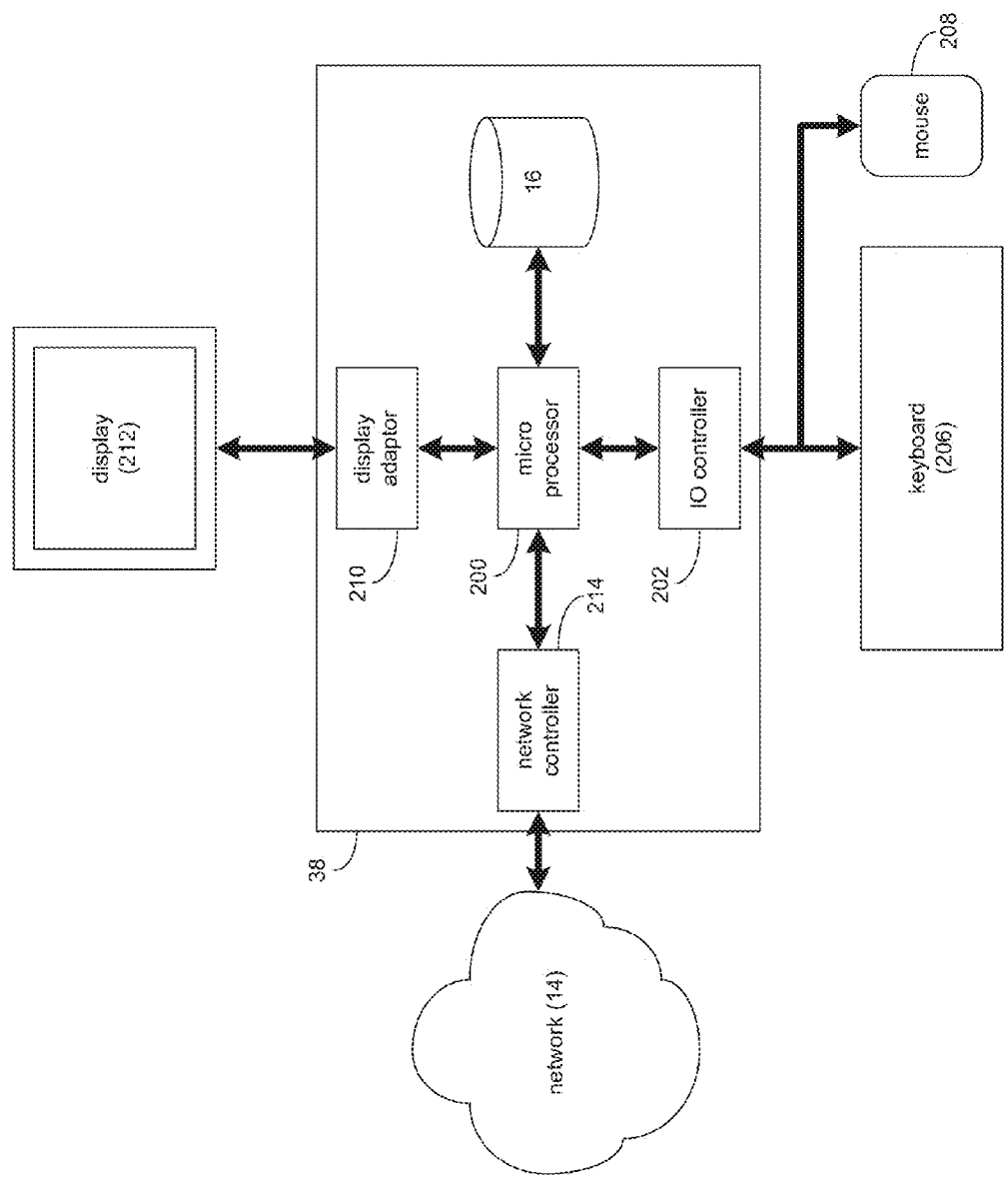
FIG. 2 is a diagrammatic view of a client electronic device of FIG. 1 according to one or more implementations of the present disclosure.
Figure 3:
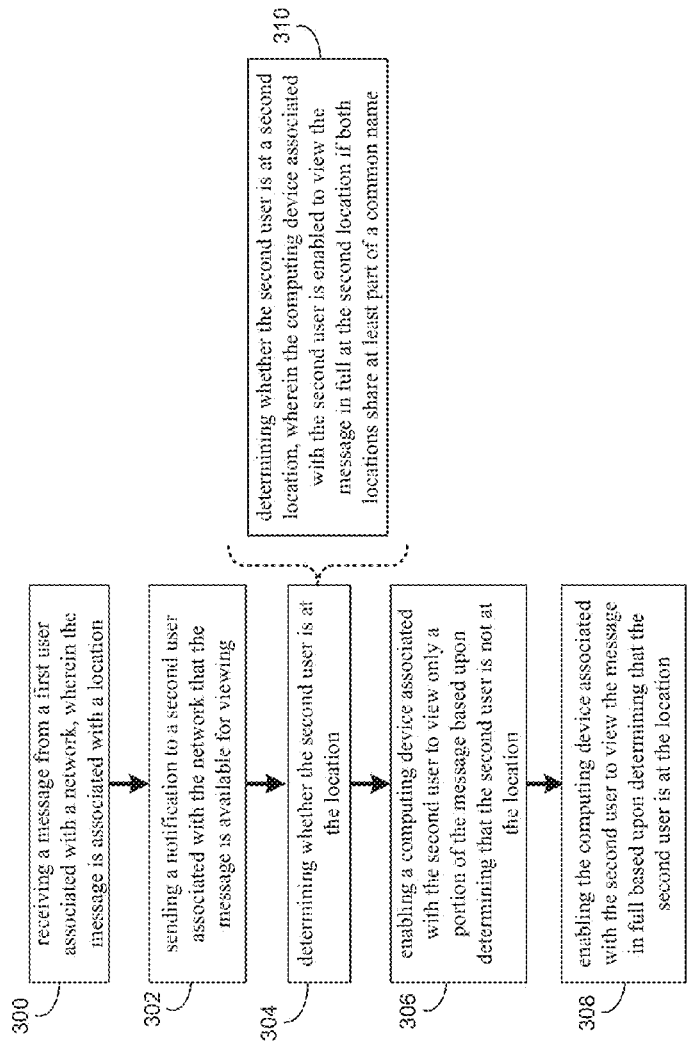
FIG. 3 is an illustrative flowchart of the message process of FIG. 1 according to one or more implementations of the present disclosure.
Figure 4:
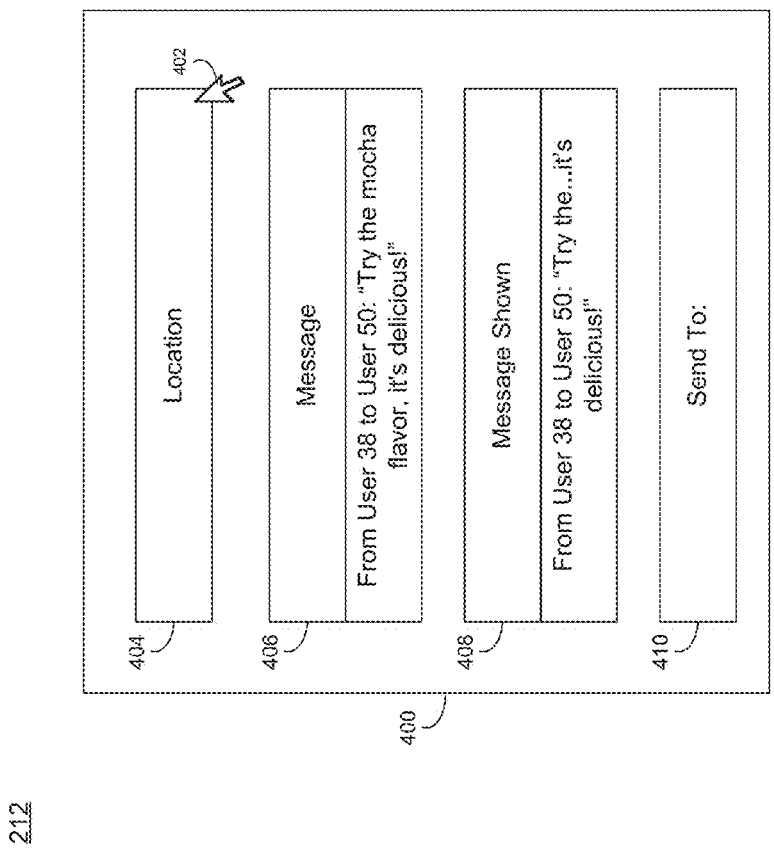
FIG. 4 is an illustrative diagrammatic view of a screen image displayed by the message process of FIG. 1 according to one or more implementations of the present disclosure.
Figure 5:
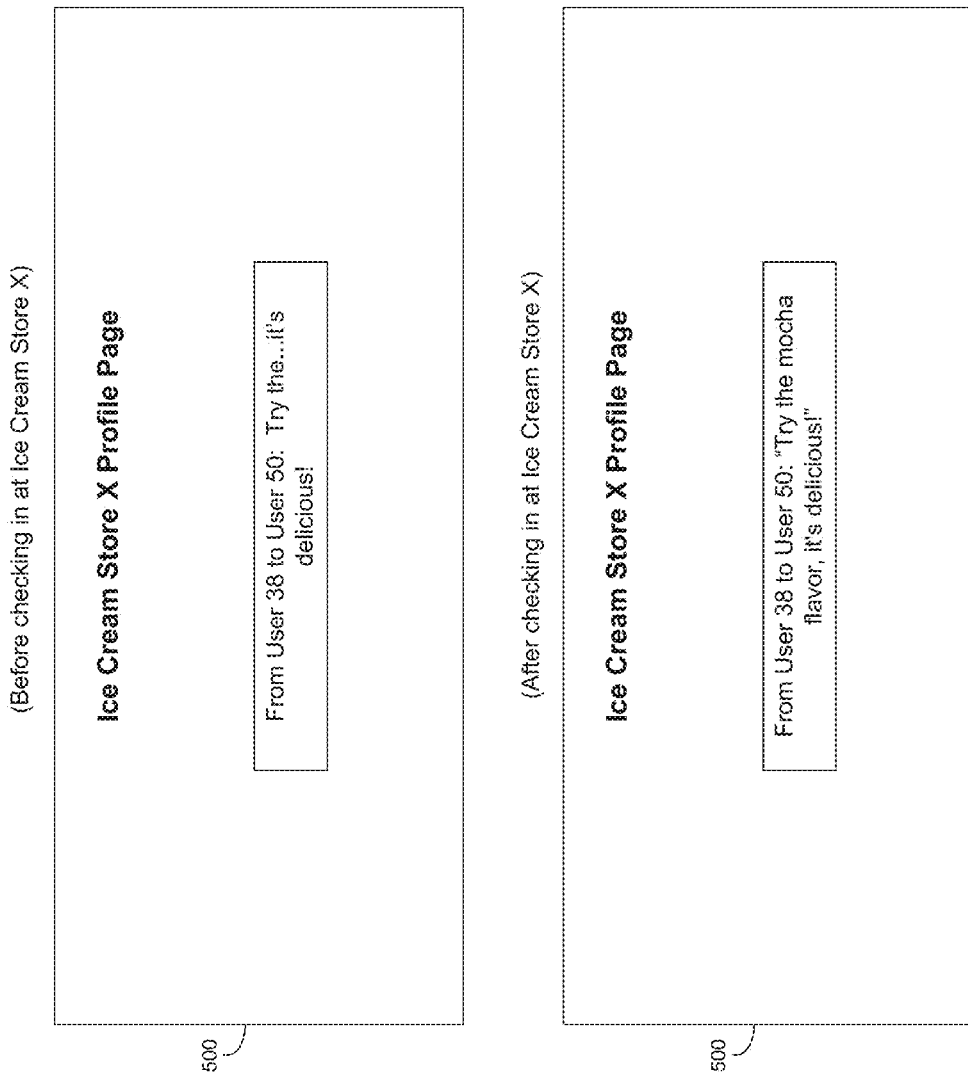
FIG. 5 is an illustrative diagrammatic view of a screen image displayed by the message process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, message process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also to FIGS. 3-6, message process 10 may receive 300 (e.g., by one or more computing devices), a message from a first user associated with a network, wherein the message may be associated with a location. A notification may be sent 302 by message process 10 to a second user associated with a network that the message is available for viewing. Whether the second user is at the location may be determined 304 by message process 10. A computing device associated with the second user may be enabled 306 by message process 10 to view only a portion of the message based upon, at least in part, determining 304 that the second user is not at the location. The computing device associated with the second user may be enabled 308 by message process 10 to view the message in full based upon, at least in part, determining 304 that the second user is at the location.

As noted above, message process 10 may receive 300 (e.g., by one or more computing devices), a message from a first user (e.g., user 38) associated with a network (e.g., a social network, communication network, etc.), wherein the message may be associated with a location. For example, user 38 may, via a user interface (e.g., user interface (UI) 400 displayed on display 212 and associated with message process 10 and/or client application 22) select a location with which to associate the message. In the example, user 38 may, e.g., via pointer 402, select a "location" portion 404 of UI 400. This may result in the ability for user 38 (e.g., via message process 10 and/or client application 22) to associate a location with the message. For example, selecting "location" portion 404 may enable, e.g., a drop down menu of locations from which to choose, an area at which user 38 may input a name of a location, a map at which user 38 may select a location on the map (e.g., via pointer 402), as well as other input options.

In some implementations, the location may include, e.g., a geographical location, a landmark, etc. In some implementations, the location may include, e.g., a business name, such as ice cream store X, and/or a business category, such as an ice cream store. The business category may include any ice cream store, and the business name may include a specific ice cream store by name (e.g., ice cream store X) and/or location (e.g., ice cream store X in San Jose, Calif.).

Continuing with the example, user 38 may use pointer 402 to select a "message" portion 406 of UI 400 that may enable user 38 to enter the full message. In some implementations, the message may include a recommendation associated with the location (e.g., ice cream store X). For instance, in the example, the full message entered by user 38 may include, "Try the mocha flavor, it's delicious!". As will be discussed in greater detail below, only a portion of the message may be viewable to other users, at least for a period of time until an event occurs (e.g., "checking in" to ice cream store X). In the example, user 38 may use pointer 402 to select a "message shown" portion 408 of UI 400 that may enable user 38 to enter the portion of the full message that is viewable to the other users until the full message is viewable. In the example, the portion of the full message entered by user 38 may include, "Try the . . . it's delicious!". In some implementations, message process 10 may automatically determine the portion of the full message viewable to other users. In some implementations, the portion of the full message may but need not actually include any portion of the original full message, and may include at least a portion of a different message, e.g., "Unlock my flavor recommendation!".

In some implementations, ice cream store X may have a profile page (e.g., associated with the network). In the example, the message may be received 300 by message process 10 from user 38 at the profile page (e.g., profile page 500) associated with the location (e.g., ice cream store X). For instance, user 38 (e.g., via message process 10, web application 20, and/or client application 22) may navigate to profile page 500 associated with ice cream store X and "post" the message on profile page 500. In some implementations, user 38 (e.g., via message process 10, web application 20, and/or client application 22) may post the message on a profile page of user 38 (and/or the profile page of another user), where an option may be provided for user 38 to "tag" the message with the location (and/or a second user). The message may be posted in locations other than a profile page of a network. For example, the message may be posted as a status update, a feed, a general web page, a blog, or other appropriate medium may be used to receive 300 the message.

In some implementations, a notification (e.g., notification 600) may be sent 302 by message process 10 to a second user (e.g., user 50) of the network via client electronic device 42 that the message is available for viewing. In some implementations, user 50 may be selected (e.g., via message process 10) from, e.g., a list, of one or more users (e.g., of the network). For instance, continuing with the above example, user 38 may use pointer 402 to select a "send to" portion 410 of UI 400 that may enable user 38 to select user 50 to receive the notification. The list may, in some implementations, self-populate as the name of user 50 is entered. In some implementations, the list may appear as a ready-populated list once "send to" portion 410 is selected.

In some implementations, notification 600 may be sent 302 by message process 10 to user 50 user via, e.g., electronic mail, a text message, a push notification, or a combination thereof. Notification 600 may be sent 302 by message process 10 to user 50 user via other techniques without departing from the scope of the disclosure.

For example, message process 10 may (e.g., via web application 20 and/or client application 26) include an "augmented reality mode" (not shown), where a rendering of the geography proximate to user 50 may appear on the display of client electronic device 42 based upon, at least in part, the current geography being captured by a camera of client electronic device 42. The geography may include a rendering of ice cream store X, where the rendering of ice cream store X may include a visual rendering that a message is waiting for user 50 to read.

In some implementations, the notification may be sent 302 by message process 10 to user 50 based upon, at least in part, a proximity of user 50 to the location. For instance, client electronic device 42 may include location services, e.g., global positioning system (GPS) capabilities. Message process 10 may, e.g., via client application 26 and/or web application 20, receive the location of user 50 (e.g., via client electronic device 42). The location of client electronic device 42 may be requested by message process 10 and/or web application 20 periodically, e.g., every 5 minutes, and/or the location of client electronic device 42 may be sent automatically (e.g., every 5 minutes) by client electronic device 42 and received by message process 10 and/or web application 20. Using the location of user 50 (e.g., via client electronic device 42), message process 10 may determine that user 50 is within a pre-defined proximity (e.g., 1 mile) to ice cream store X. As such, in the example, once user 50 is within 1 mile of ice cream store X, the notification may be sent 302 by message process 10 to user 50. In some implementations, user 50 may adjust privacy settings to prevent the location from being sent and/or determined.

In some implementations, using any of the above-noted techniques, message process 10 may determine 304 whether user 50 (e.g., client electronic device 42) is at (or near) ice cream store X. In the example, as described above, the notification may be sent 302 by message process 10 to user 50 based upon, at least in part, the proximity of user 50 being at (or near) ice cream store X. As another example, message process 10 may determine 304 whether user 50 is at (or near) ice cream store X based upon whether or not user 50 (e.g., via client application 26, message process 10, and/or web application 20) has "checked in" to ice cream store X. In the example, as described above, the notification may be sent 302 by message process 10 to user 50 based upon, at least in part, the proximity of user 50 to ice cream store X as determined 302 by message process 10 when, e.g., user 50 "checks in" to ice cream store X. In some implementations, user 50 may adjust privacy settings to prevent the location from being sent and/or determined.

In some implementations, a computing device associated with user 50 (e.g., client electronic device 42) may be enabled 306 by message process 10 (e.g., via client application 26 and/or web application 20) to view only a portion of the message (e.g., the portion entered by user 38 via the above-noted "message shown" portion 408) based upon, at least in part, determining 304 that user 50 is not at the location (e.g., ice cream store X). For instance, assume for example purposes only that the above-noted notification 600 includes, e.g., a link, that, when selected by user 50, navigates (e.g., via client application 26) to profile page 500 of ice cream store X where user 38 (e.g., via message process 10, web application 20, and/or client application 22) has posted the message. In the example, if message process 10 determines 304 (using any of the above-noted techniques) that user 50 is not at ice cream store X, then client electronic device 42 may be enabled 306 by message process 10 to view only the "Try the . . . it's delicious!" portion of the message, thus enabling user 50 to view only the portion of the message.

In some implementations, computing device associated with user 50 (e.g., client electronic device 42) may be enabled 308 by message process 10 (e.g., via client application 26 and/or web application 20) to view the message in full (e.g., the portion entered by user 38 via the above-noted "message" portion 406) based upon, at least in part, determining 304 that the second user (e.g., user 50) is at the location (e.g., ice cream store X). For instance, continuing with the above example, if message process 10 determines 304 (using any of the above-noted techniques) that user 50 is at ice cream store X (which may include determining 304 whether user 50 has at least previously been to ice cream store X, and/or determining 304 whether user 50 has at least been to ice cream store X since user 50 received notification 600), then client electronic device 42 may be enabled 308 by message process 10 to view the message in full (e.g., "Try the mocha flavor, it's delicious!"), thus enabling user 50 to view the message in full. The full message may be viewed, e.g., at the above-noted profile page 500, the above-noted notification 600, and/or sent to user 50 automatically (e.g., via text message, electronic mail, push notification, etc.) in response to, e.g., message process 10 determining 304 that client electronic device 42 is at ice cream store X.

By enabling 308 client electronic device 42 (and thus user 50) to view the message in full after, e.g., "checking in" at ice cream store X, a "treasure hunt" style activity may be created that may encourage user 50 to visit ice cream store X, and may encourage user 50 to provide additional recommendations for other users. As such, ice cream store X may increase the amount of business it receives.

In some implementations, determining 304 whether user 50 is at ice cream store X may include message process 10 determining 310 whether the second user is at a second location, wherein client electronic device 42 associated with user 50 may be enabled 308 to view the message in full at the second location if both locations share at least part of a common name. For example, ice cream store X may be a chain of stores that each may be separately located. For instance, a first ice cream store X may be located in San Jose, Calif., and a second ice cream store X may be located in Boston, Mass. In the example, message process 10 may determine 310 that user 50 is at ice cream store X in Boston, Mass. Further in the example, while the message may be associated with ice cream store X in San Jose, Calif., because ice cream store X in both San Jose, Calif. and in Boston, Mass. share at least part of a common name (e.g., ice cream store X), user 50 (e.g., via client electronic device 42) may still be enabled 308 to view the message in full message process 10 determines 310 that user 50 is at ice cream store X in Boston, Mass., ice cream store X in Boston, Mass., or combination thereof.

In some implementations, UI 400 (e.g., via client application 22, message process 10, and/or web application 20) may provide an option (not shown) that may require user 50 (e.g., via client electronic device 42) to be at ice cream store X in Boston, Mass. before client electronic device 42 may be enabled 308 to view the message in full. That is, in some implementations, even if user 50 is at ice cream store X in San Jose, Calif., client electronic device 42 may be enabled 306 by message process 10 to view only the "Try the . . . it's delicious!" portion of the message until message process 10 determines 304 that user 50 is at ice cream store X in Boston, Mass.

In some implementations, client electronic device 42 may be enabled 308 by message process 10 to view the message in full (e.g., "Try the mocha flavor, it's delicious!"), even if message process 10 determines 304 (using any of the above-noted techniques) that user 50 is not at ice cream store X. For example, message process 10 may (e.g., via notification 600) provide the option (not shown) to bypass the requirement to, e.g., "check in" to ice cream store X, before enabling 308 client electronic device 42 to view the message in full.

The present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
receiving, by one or more computing devices, a message from a first user associated with a network, wherein the message is associated with a location;
sending a notification to a second user associated with the network that the message is available for viewing;
determining whether the second user is at the location;
in response to determining that the second user is not at the location:
enabling a computing device associated with the second user to view only a portion of the message for a period of time until an event occurs;
determining that the event has occurred, wherein the event indicates that the second user has checked in at the location; and
enabling the computing device associated with the second user to view the message in full; and
in response to determining that the second user is at the location, enabling the computing device associated with the second user to view the message in full.

2. The computer-implemented method of claim 1 wherein the message includes a recommendation associated with the location.

3. The computer-implemented method of claim 1 wherein the notification is sent to the second user based upon a proximity of the second user to the location.

4. The computer-implemented method of claim 1 wherein determining whether the second user is at the location includes determining whether the second user is at a second location, wherein the computing device associated with the second user is enabled to view the message in full at the second location if both locations share at least part of a common name.

5. The computer-implemented method of claim 1 wherein the notification is sent to the second user via at least one of electronic mail, a text message, and a push notification.

6. The computer-implemented method of claim 1 wherein the second user is selected from a list of users associated with the network.

7. The computer-implemented method of claim 1 wherein the message is received from the first user at a profile page associated with the location.

8. A computing system including a processor and a memory configured to perform operations comprising:
receiving a message from a first user associated with a network, wherein the message is associated with a location;
sending a notification to a second user associated with the network that the message is available for viewing;
determining whether the second user is at the location;
in response to determining that the second user is not at the location:
enabling a computing device associated with the second user to view only a portion of the message for a period of time until an event occurs;
determining that the event has occurred, wherein the event indicates that the second user has checked in at the location; and
enabling the computing device associated with the second user to view the message in full; and
in response to determining that the second user is at the location, enabling the computing device associated with the second user to view the message in full.

9. The computing system of claim 8 wherein the message includes a recommendation associated with the location.

10. The computing system of claim 8 wherein the notification is sent to the second user based upon a proximity of the second user to the location.

11. The computing system of claim 8 wherein determining whether the second user is at the location includes determining whether the second user is at a second location, wherein the computing device associated with the second user is enabled to view the message in full at the second location if both locations share at least part of a common name.

12. The computing system of claim 8 wherein the notification is sent to the second user via at least one of electronic mail, a text message, and a push notification.

13. The computing system of claim 8 wherein the second user is selected from a list of users associated with the network.

14. The computing system of claim 8 wherein the message is received from the first user at a profile page associated with the location.

15. A computer program product residing on a non-transitory computer readable storage medium having a plurality of instructions stored thereon which, when executed by a processor, cause the processor to perform operations comprising:
receiving a message from a first user associated with a network, wherein the message is associated with a location;
sending a notification to a second user associated with the network that the message is available for viewing;
determining whether the second user is at the location;
in response to determining that the second user is not at the location:
enabling a computing device associated with the second user to view only a portion of the message for a period of time until an event occurs;

determining that the event has occurred, wherein the event indicates that the second user has checked in at the location; and enabling the computing device associated with the second user to view the message in full; and in response to determining that the second user is at the location, enabling the computing device associated with the second user to view the message in full.

16. The computer program product of claim 15 wherein the message includes a recommendation associated with the location.

17. The computer program product of claim 15 wherein the notification is sent to the second user based upon a proximity of the second user to the location.

18. The computer program product of claim 15 wherein determining whether the second user is at the location includes determining whether the second user is at a second location, wherein the computing device associated with the second user is enabled to view the message in full at the second location if both locations share at least part of a common name.

19. The computer program product of claim 15 wherein the notification is sent to the second user via at least one of electronic mail, a text message, and a push notification.

20. The computer program product of claim 15 wherein the message is received from the first user at a profile page associated with the location.

\* \* \* \* \*